(12) United States Patent
Mielenz et al.

(10) Patent No.: US 10,914,594 B2
(45) Date of Patent: Feb. 9, 2021

(54) METHOD AND APPARATUS FOR LOCALIZING AND AUTOMATICALLY OPERATING A VEHICLE

(71) Applicant: Robert Bosch GmbH, Stuttgart (DE)

(72) Inventors: Holger Mielenz, Ostfildern (DE); Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 16/026,378

(22) Filed: Jul. 3, 2018

(65) Prior Publication Data

US 2019/0017833 A1 Jan. 17, 2019

(30) Foreign Application Priority Data

Jul. 12, 2017 (DE) .................. 10 2017 211 887

(51) Int. Cl.
| | |
|---|---|
| *G01C 21/32* | (2006.01) |
| *G05D 1/00* | (2006.01) |
| *G06K 9/00* | (2006.01) |
| *G06F 16/29* | (2019.01) |
| *G01C 21/30* | (2006.01) |
| *G05D 1/02* | (2020.01) |

(52) U.S. Cl.
CPC ............ *G01C 21/32* (2013.01); *G01C 21/30* (2013.01); *G05D 1/0088* (2013.01); *G05D 1/0246* (2013.01); *G05D 1/0274* (2013.01); *G05D 1/0278* (2013.01); *G06F 16/29* (2019.01); *G06K 9/00791* (2013.01); *G05D 2201/0213* (2013.01)

(58) Field of Classification Search
CPC ........ G01C 21/30; G01C 21/32; G01C 21/26; G01C 21/28; G05D 1/0088; G05D 1/0246; G05D 1/0274; G05D 1/0278; G05D 2201/0213; G06F 16/29; G06K 9/00791; G06K 9/00771; G06K 9/00778; G06K 9/00798; G06K 9/00805; G06K 9/00362; G06K 9/00832; B60W 60/001
USPC ........................................................ 701/446
See application file for complete search history.

(56) References Cited

U.S. PATENT DOCUMENTS

| | | | | |
|---|---|---|---|---|
| 8,917,764 | B2 * | 12/2014 | Gupta ..................... | G06T 7/215 |
| | | | | 375/240.02 |
| 9,245,189 | B2 * | 1/2016 | Sasaki ................ | G06K 9/00805 |
| 9,495,874 | B1 * | 11/2016 | Zhu ......................... | G08G 1/165 |
| 10,262,437 | B1 * | 4/2019 | Ter Beest, III ........... | G06T 7/74 |
| 10,271,018 | B2 * | 4/2019 | Lee ......................... | H04N 7/181 |

(Continued)

*Primary Examiner* — Angelina Shudy
(74) *Attorney, Agent, or Firm* — Norton Rose Fulbright US LLP; Gerard Messina

(57) ABSTRACT

A method and an apparatus for localizing and automatically operating a vehicle, including the task of detecting environmental data values that represent an environment of the vehicle, the environment of the vehicle including at least one interfering object; determining an environment class of the environment of the vehicle; determining a high-accuracy position of the vehicle based on the environmental data values, at least one filter being applied to filter the at least one interfering object out of the environmental data values, the at least one filter being selected as a function of the environment class, and the high-accuracy position being determined after the at least one interfering object is filtered out; and automatically operating the vehicle as a function of the high-accuracy position.

13 Claims, 3 Drawing Sheets

(56) References Cited

U.S. PATENT DOCUMENTS

| | | | | |
|---|---|---|---|---|
| 2012/0133497 A1* | 5/2012 | Sasaki | ................ | G06K 9/00805 340/425.5 |
| 2013/0039409 A1* | 2/2013 | Gupta | ..................... | G06T 7/215 375/240.02 |
| 2017/0329332 A1* | 11/2017 | Pilarski | ............. | B60W 50/0097 |
| 2017/0371336 A1* | 12/2017 | Mei | ...................... | G05D 1/0212 |
| 2018/0216937 A1* | 8/2018 | Mielenz | ............. | G06K 9/00791 |
| 2020/0026283 A1* | 1/2020 | Barnes | ................ | G05D 1/0246 |
| 2020/0125088 A1* | 4/2020 | Raichelgauz | ...... | G06K 9/00805 |
| 2020/0125866 A1* | 4/2020 | Raichelgauz | ........ | G06N 3/0418 |
| 2020/0130684 A1* | 4/2020 | Raichelgauz | ..... | B60W 60/0016 |
| 2020/0133290 A1* | 4/2020 | Raichelgauz | ........ | G06K 9/6288 |

* cited by examiner

METHOD AND APPARATUS FOR LOCALIZING AND AUTOMATICALLY OPERATING A VEHICLE

RELATED APPLICATION INFORMATION

The present application claims priority to and the benefit of German patent application no. 10 2017 211 887.3, which was filed in Germany on Jul. 12, 2017, the disclosure which is incorporated herein by reference.

FIELD OF THE INVENTION

The present invention relates to a method and an apparatus for localizing and automatically operating a vehicle, having a step of detecting environmental data values, a step of determining an environment class of the environment of the vehicle, a step of determining a high-accuracy position of the vehicle based on the environmental data values, and a step of automatically operating the vehicle as a function of the high-accuracy position.

SUMMARY OF THE INVENTION

The method according to the present invention for localizing and automatically operating a vehicle encompasses a step of detecting environmental data values that represent an environment of the vehicle, the environment of the vehicle encompassing at least one interfering object; and a step of determining an environment class of the environment of the vehicle. The method furthermore encompasses a step of determining a high-accuracy position of the vehicle based on the environmental data values, at least one filter being applied in order to filter the at least one interfering object out of the environmental data values, the at least one filter being selected as a function of the environment class, and the high-accuracy position being determined after the at least one interfering object is filtered out; and a step of automatically operating the vehicle as a function of the high-accuracy position.

"Automatically operating" the vehicle is to be understood to mean that the vehicle is embodied as a partly, highly, or fully automated vehicle, and is operated correspondingly in partly, highly, or fully automated manner.

"Localizing" the vehicle is understood to mean determining the high-accuracy position.

A "high-accuracy position" is to be understood as a position that is sufficiently accurate within a predefined coordinate system, for example GPS coordinates, that that position does not exceed a maximum permissible uncertainty. The maximum uncertainty can depend, for example, on the environment and/or on the environment class. The maximum uncertainty can furthermore depend on whether the vehicle is being operated in partly, highly, or fully automated manner. In principle, the maximum uncertainty is so low that safe operation of the vehicle is ensured. For fully automated operation of the vehicle, for example, the maximum uncertainty is on the order of approximately 10 centimeters.

An "environment" of the vehicle is to be understood, for example, as a region that can be detected by way of an environmental sensor suite of the vehicle.

An "environment class" is to be understood as an allocation of the environment of the vehicle which is effected on the basis of specific criteria, an environment class corresponding, for example, to one of the following allocations: residential area, industrial area, main road, expressway, pedestrian zone, parking garage, parking lot, tunnel, bridge, rural environment, urban environment, forest, field, mountainous environment, flat environment, single-lane roadway, multi-lane roadway, etc. The criteria for allocation are, for example, road signs that are detected by way of an environmental sensor suite of the vehicle. They allow, for example, an allocation as to expressway, pedestrian zone, tunnel, bridge, etc., by evaluation of the road signs.

The method according to the present invention advantageously solves the problem that a determination of the high-accuracy position of the vehicle, which position is required for partly, highly, or fully automated operation of the vehicle, cannot be made because at least one interfering object is present in the environment of the vehicle. By way of at least one suitable filter, the at least one interfering object that is present is filtered out of environmental data values that represent the environment of the vehicle, in such a way that the high-accuracy position can then be determined. This advantageously enhances safety in the context of automated operation of the vehicle, both for occupants and for the vehicle and, for example, for persons (pedestrians) in the environment of the vehicle.

It is also apparent, advantageously, that by way of the method according to the present invention, for example, there is no need to use several filters, but instead the correct filter or filters can be applied based on the environment class; this both economizes on computation capacity in the vehicle and enhances the safety of the vehicle, since the high-accuracy position is determined more quickly.

The environment class may be determined based on the environmental data values. The advantage apparent here is that the environment class is determined ad hoc in the vehicle after detection of the environmental data values, and the at least one filter is therefore applied very quickly for filtering out. This increases safety in the context of automated operation of the vehicle.

Particularly, the environment class may be determined by the fact that an approximate position of the vehicle is transferred to an external server, and the environment class, as a function of the approximate position, is received from the external server. The advantage apparent here is that the environment class is determined even when a determination by way of the environmental sensor suite can be made only with great difficulty or not at all, for example because of fog, snow, or rain. A further advantage that is apparent is that the environment classes on the server, or the allocation based on the specific criteria, can be continuously updated and/or continuously improved.

An "approximate position" is to be understood as a position that is sufficiently inaccurate within a predefined coordinate system, for example GPS coordinates, that that position exceeds a maximum permissible uncertainty that is required, for example, for reliable automated operation of the vehicle. The approximate position is determined, for example, by way of a navigation system that is encompassed by the vehicle, and is then transferred to the external server by way of a transmission and/or reception unit that is likewise encompassed by the vehicle. In a further embodiment, the navigation system and the transmission and/or reception unit are embodied in the same device, which is embodied e.g. as a smartphone and is connected to the vehicle by way of a radio connection (Bluetooth, etc.) or a cable.

Particularly, the vehicle may be automatically operated in such a way that transverse and/or longitudinal control is applied to the vehicle as a function of the high-accuracy position.

In a particular embodiment, the at least one filter is selected as a function of the environment class by the fact that the environment class encompasses a most frequently occurring interfering object, and the at least one filter filters out at least the most frequently occurring interfering object. The advantage apparent here is that the at least one interfering object is filtered out as quickly as possible, and the high-accuracy position of the vehicle is thus determined as quickly as possible, since not all the filters need to be applied but instead only the at least one filter that filters out the most frequently occurring interfering object. The vehicle can thus be operated more quickly and thus also more safely as a function of the high-accuracy position.

The most frequently occurring interfering object may be a dynamic or a semi-static or a static interfering object. The advantage apparent here is that the at least one filter can be applied quickly and efficiently by differentiating the most frequently occurring interfering object in terms of dynamic or semi-static or static interfering objects, thereby enhancing safety in the context of automated operation of the vehicle.

Particularly, the environment of the vehicle may encompass the at least one interfering object in such a way that at least one environmental feature that is used to determine the high-accuracy position of the vehicle is obscured at least partly and/or temporarily by the at least one interfering object.

In the absence of interfering objects, determination of the high-accuracy position is accomplished, for example, by the fact that the environmental data values that represent the environment of the vehicle are detected using an environmental sensor suite, the environment encompassing the at least one environmental feature, and the environmental data values being detected in such a way that a distance and/or a relative motion of the vehicle with respect to the at least one environmental feature is determined, and the high-accuracy position of the vehicle is thereby determined based on the high-accuracy position of the at least one environmental feature. The high-accuracy position of the at least one environmental feature is, for example, stored in a map in the vehicle for that purpose. In an embodiment, the approximate position of the vehicle is determined, for example, by way of a navigation system and then, by way of a reconciliation of the approximate position with the map, all the environmental features (whose high-accuracy positions are known and stored in the map) are furnished in such a way that the high-accuracy position of the vehicle can be determined based on those environmental features.

For example, an environmental feature is stored in the map with the high-accuracy GPS coordinates. Based on the approximate position of the vehicle, which is determined e.g. by way of a navigation system, the environmental feature is loaded from the map and furnished together with the coordinates, since the environmental feature is located in the environment of the vehicle. In an alternative embodiment, the approximate position is determined, for example, by way of an acceleration sensor and/or by way of further sensors that are embodied to detect an approximate position of the vehicle. From the detected environmental data values which encompass the environmental feature, for example, a distance d and/or a relative motion—which is determined, for example, by way of a speed of the vehicle and a direction in which the vehicle is moving—are determined. It is thereby ultimately possible to determine the high-accuracy position of the vehicle, based on the position, by vector addition.

The at least one environmental feature can depend in terms of its embodiment, for example, on the environment and/or the environment class. For example, the at least one environmental feature can be a road sign and/or a building and/or a roadway marking and/or street lighting devices and/or localization apparatuses that are specifically embodied to be detected by an environmental sensor suite, and/or further environmental features that are suitable, for example, for being detected by way of an environmental sensor suite in such a way that a distance and/or a relative motion with respect to the at least one environmental feature can be determined.

An "interfering object" and/or a "most frequently occurring interfering object" are to be understood as objects that obscure the at least one environmental feature at least partly and/or temporarily in such a way that the at least one environmental feature is detected in such a way that a distance and/or a relative motion cannot be determined, and/or can respectively be determined only in such a way that at least a high-accuracy position cannot be determined. For example, the vector addition described above cannot be performed completely, with the result that the maximum uncertainty cannot be complied with.

A "dynamic" interfering object is, for example, a bicyclist and/or a pedestrian and/or a vehicle, etc. A "semi-static" object is a vehicle that is parking and/or a bus that is stopping at a bus stop and/or generally vehicles that, for example because of a road sign and/or a traffic state, are at least temporarily obscuring the at least one environmental feature. A "static" interfering object is, for example, a recently constructed building or new plantings that are obscuring the at least one environmental feature at least over the longer term (for example, days, weeks, or even longer).

The "pedestrian" and/or "bicyclist" interfering objects are, for example, allocated to the "pedestrian zone" environment class as a most frequently occurring interfering object. In a further embodiment, dynamic interfering objects are, for example, allocated to the "pedestrian zone" environment class as most frequently occurring interfering objects. Parking vehicles or semi-static interfering objects are correspondingly allocated, for example, to the "residential area" environment class. Driving vehicles, in particular trucks, or dynamic interfering objects are correspondingly allocated, for example, to the "expressway" environment class.

The apparatus according to the present invention for localizing and automatically operating a vehicle encompasses first means (a detecting arrangement) for detecting environmental data values that represent an environment of the vehicle, the environment of the vehicle encompassing at least one interfering object; and second means (an environment class determining arrangement) for determining an environment class of the environment of the vehicle. The apparatus furthermore encompasses third means (a position determining arrangement) for determining a high-accuracy position of the vehicle based on the environmental data values, at least one filter being applied in order to filter the at least one interfering object out of the environmental data values, the at least one filter being selected as a function of the environment class, and the high-accuracy position being determined after the at least one interfering object is filtered out; and fourth means (a filtering arrangement) for automatically operating the vehicle as a function of the high-accuracy position.

The first means are embodied, for example, in such a way that they encompass an environmental sensor suite. In a further embodiment, the first means are embodied in such a way that they are connected to an environmental sensor suite already encompassed by the vehicle. The first means are embodied for that purpose, for example, as a computation unit that processes and evaluates environmental data values by way of suitable software.

The second means are embodied, for example, as a transmission and/or reception unit if the environment class is received from an external server. In a further embodiment, the second means are embodied in such a way that they are connected to a transmission and/or reception unit already encompassed by the vehicle.

In a further embodiment, the second means are embodied as an evaluation unit or computation unit that is embodied to determine an environment class, for example by way of suitable object classification algorithms, on the basis of objects in the environment of the vehicle.

The third means are embodied, for example, as a control device and/or computation unit that encompass, for example, a processor, working memory, and a hard drive as well as suitable software for determining a high-accuracy position of the vehicle.

The fourth means are embodied, for example, as a control device, in such a way that the vehicle is automatically operated as a function of the high-accuracy position.

In a further embodiment the fourth means are embodied, for example, as a control device in such a way that at least one further control device that is not encompassed by the apparatus has control applied to it in such a way that the vehicle is automatically operated.

The first means and/or the second means and/or the third means and/or the fourth means may be embodied to execute a method in accordance with at least one of the descriptions herein.

Advantageous refinements of the invention are described in the further descriptions herein as set forth in the description.

Exemplifying embodiments of the invention are depicted in the drawings and will be explained in further detail in the descriptions that follow.

DETAILED DESCRIPTION

Figure 1:
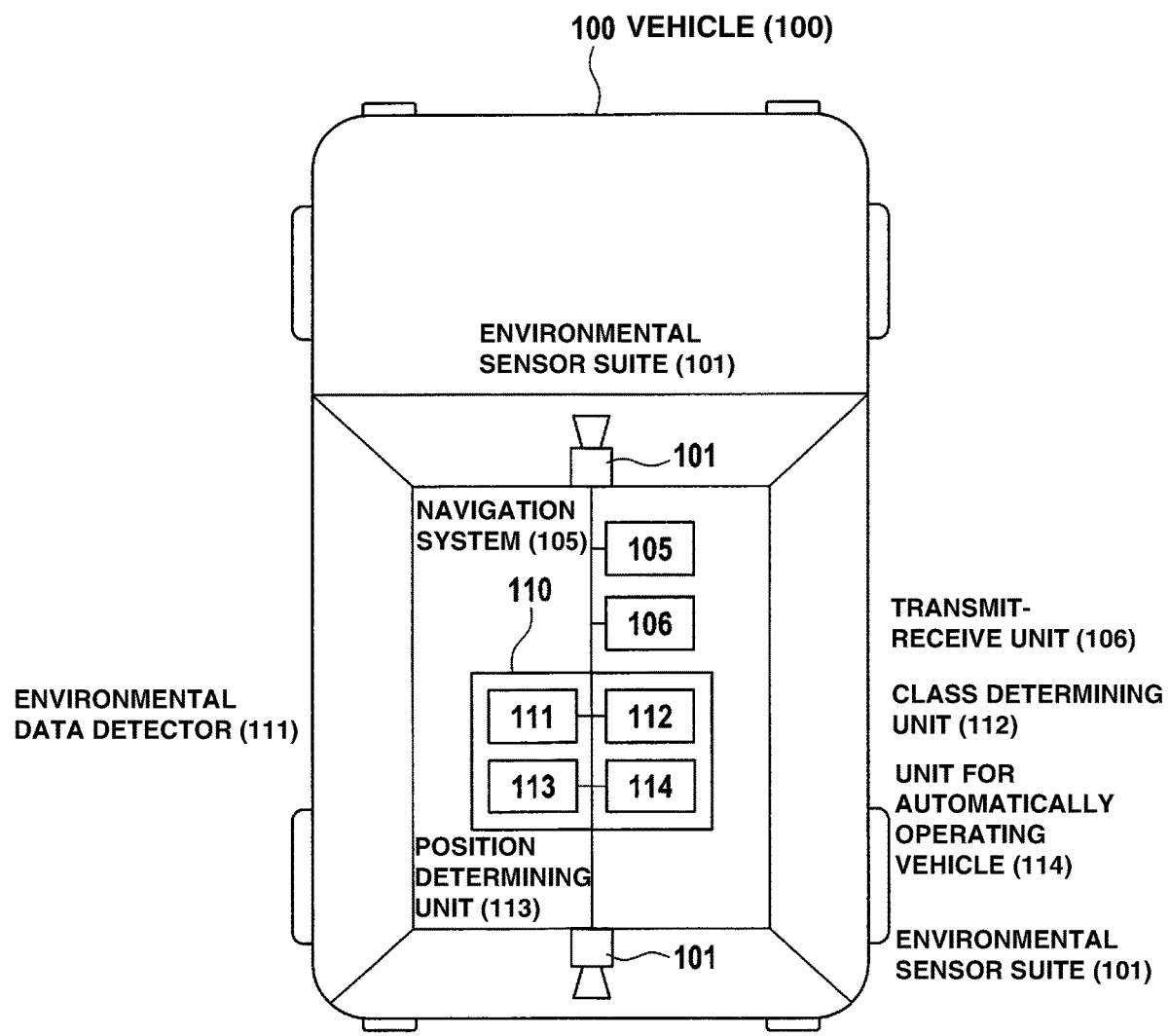
FIG. 1 shows, by way of example, an exemplifying embodiment of the apparatus according to the present invention.

FIG. 1 shows a vehicle 100 that encompasses apparatus 110 according to the present invention. Apparatus 110 for localizing and automatically operating 340 vehicle 100 encompasses first means 111 for detecting 310 environmental data values that represent an environment 200 of vehicle 100, environment 200 of vehicle 100 encompassing at least one interfering object 210; and second means 112 for determining 320 an environment class of environment 200 of vehicle 100. Apparatus 110 furthermore encompasses third means 113 for determining 330 a high-accuracy position 201 of vehicle 100 based on the environmental data values, at least one filter being applied in order to filter the at least one interfering object 210 out of the environmental data values, the at least one filter being selected as a function of the environment class, and high-accuracy position 201 being determined after the at least one interfering object 210 is filtered out; and fourth means 114 for automatically operating 340 vehicle 100 as a function of high-accuracy position 201.

Vehicle 100 and/or first means 111 furthermore encompass an environmental sensor suite 101. An "environmental sensor suite" 101 is to be understood, for example, as one or more cameras and/or one or more radar sensors and/or one or more lidar sensors and/or one or more ultrasonic sensors and/or at least one further sensor that is embodied to detect environment 200 of vehicle 100 in the form of environmental data values.

In an embodiment, vehicle 100 and/or second means 112 furthermore encompass a navigation system 105 that is embodied, for example, to determine an approximate position 202 of vehicle 100. Vehicle 100 and/or second means 112 furthermore encompass, additionally or alternatively, a transmission and/or reception unit 106. In a further embodiment, navigation system 105 and transmission and/or reception unit 106 are embodied in the same device.

Figure 2:
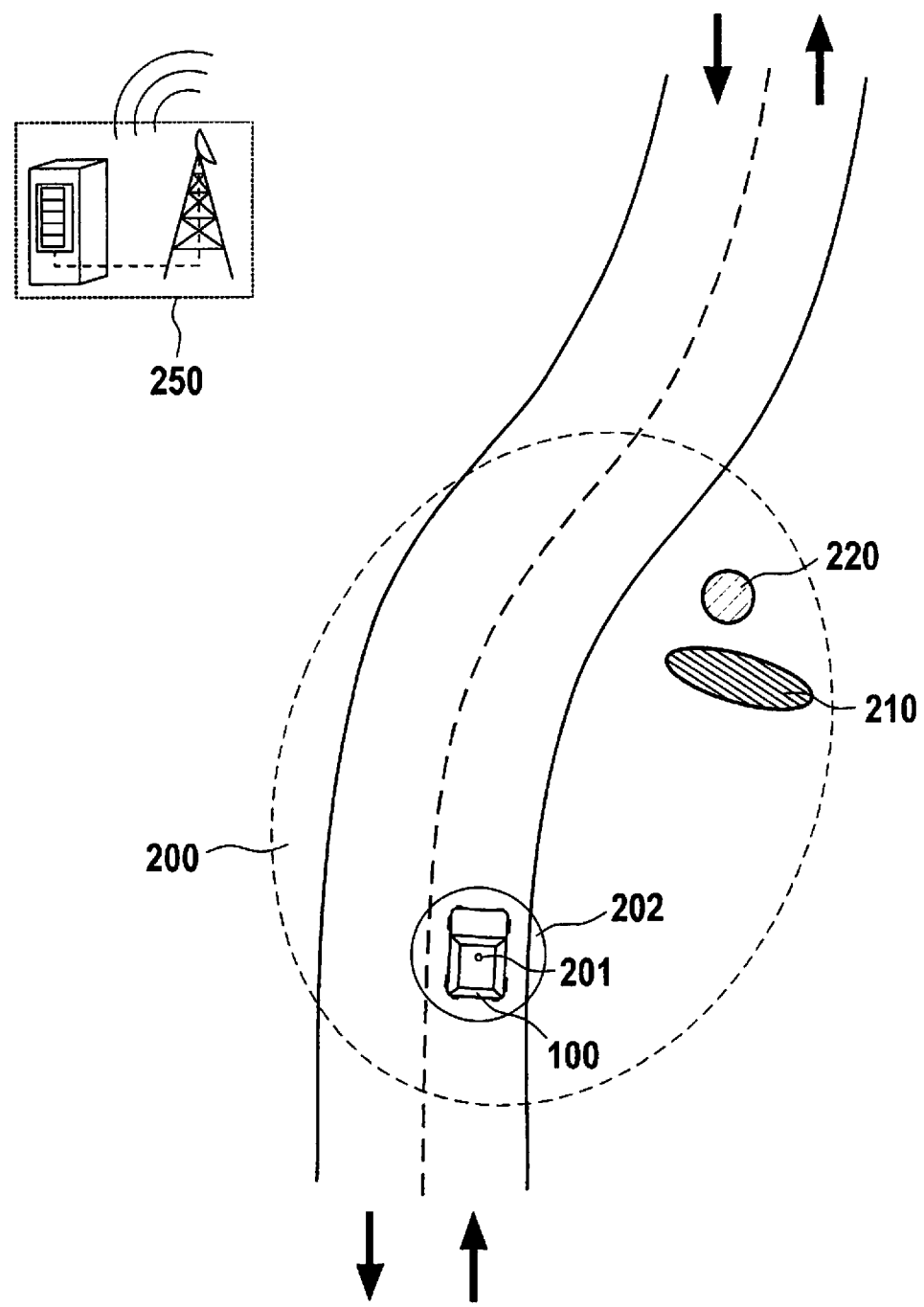
FIG. 2 shows, by way of example, an exemplifying embodiment of the method according to the present invention.

FIG. 2 is a schematic depiction of an exemplifying embodiment of method 300 according to the present invention. Here a vehicle 100 is driving automatically on a road and is detecting environmental data values that represent an environment 200 of vehicle 100, environment 200 of vehicle 100 encompassing at least one interfering object 210. Environment 200 of vehicle 100 encompasses the at least one interfering object 210 in such a way that at least one environmental feature 220 that is used to determine 330 a high-accuracy position 201 of vehicle 100 is at least partly and/or temporarily obscured by the at least one interfering object 210.

In order for high-accuracy position 201 to be determined nonetheless, an environment class is determined by the fact that an approximate position 202 of vehicle 100 is transferred to an external server 250, and the environment class, as a function of approximate position 202, is received from external server 250.

High-accuracy position 201 is then determined based on the environmental data values, at least one filter being applied in order to filter the at least one interfering object 210 out of the environmental data values, and the at least one filter being selected as a function of the environment class. This is accomplished by the fact that the environment class encompasses a most frequently occurring interfering object, and the at least one filter filters out at least the most frequently occurring interfering object. In this exemplifying embodiment, the most frequently occurring interfering object corresponds to the at least one interfering object 210.

The at least one filter is embodied, for example, as software that is encompassed by third means 113 of apparatus 110. The actual manner of operation of a filter also depends, inter alia, on environmental sensor suite 101 and on the environmental data values detected therewith. If the environmental data values are detected, for example, in the form of several images by way of a camera, a filter can represent image improvement using digital signal processing (software) by the fact that several images are made of the at least one environmental feature 220 and are then low-pass filtered along a time axis. The result is to remove noise but also objects, for example the at least one interfering object 210 (for example, a person walking past). This exemplifying embodiment of a filter is merely an example and not exhaustive. There are many further filters that are not (cannot) all be listed here and are appropriate for method 300.

High-accuracy position 201 is determined after the at least one interfering object 210 is filtered out; and vehicle 100 is automatically operated as a function of high-accuracy position 201.

Figure 3:
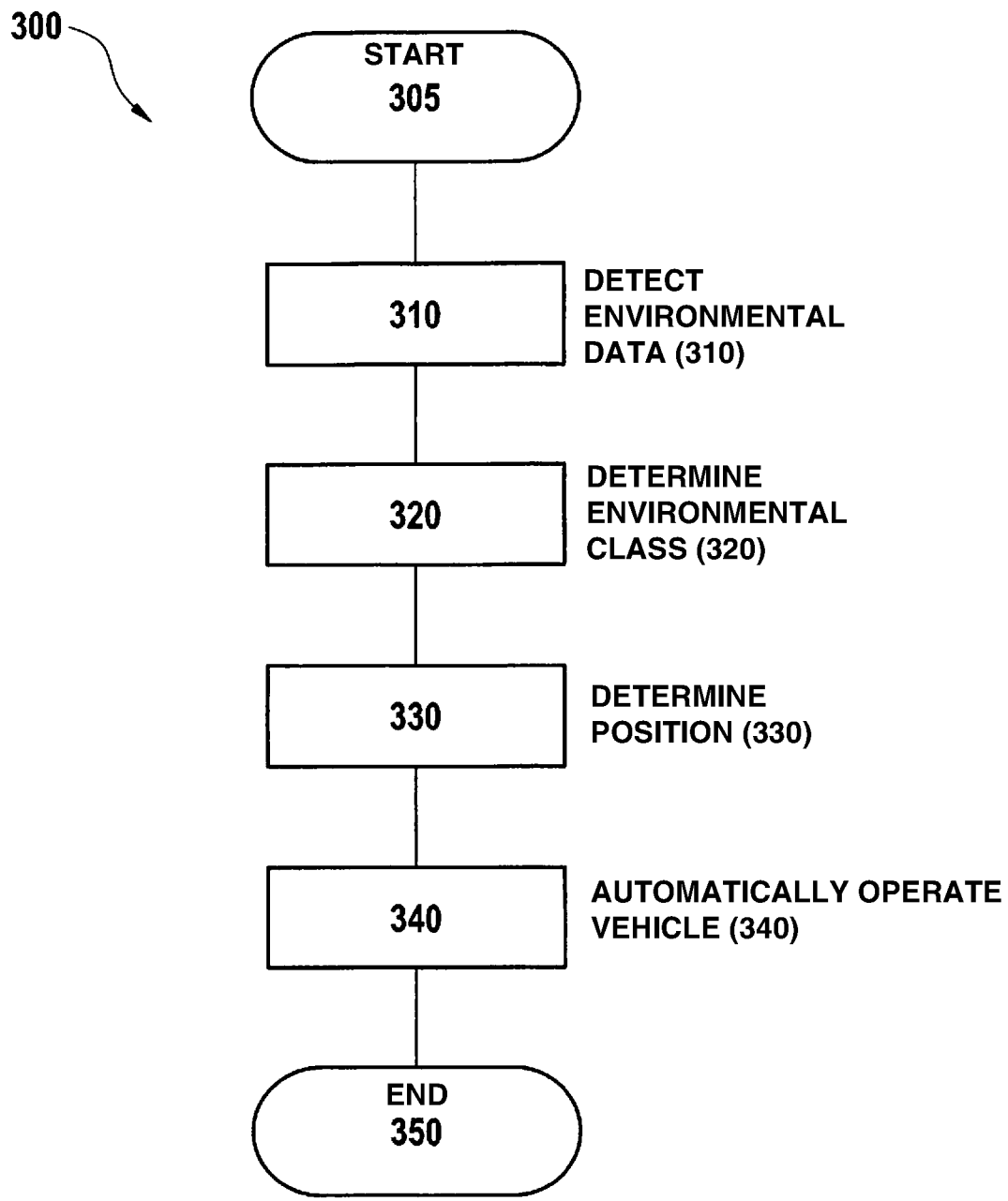
FIG. 3 shows, by way of example, an exemplifying embodiment of the method according to the present invention in the form of a flow chart.

FIG. 3 shows an exemplifying embodiment of method 300 according to the present invention.

In step 305, method 300 starts.

In step 310, environmental data values that represent an environment 200 of vehicle 100 are detected, environment 200 of vehicle 100 encompassing at least one interfering object 210.

In step 320, an environment class of environment 200 of vehicle 100 is determined.

In step 330, a high-accuracy position 201 of vehicle 100 is determined based on the environmental data values, at least one filter being applied in order to filter the at least one interfering object 210 out of the environmental data values, the at least one filter being selected as a function of the environment class, and high-accuracy position 201 being determined after the at least one interfering object 210 is filtered out.

In step 340, vehicle 100 is automatically operated as a function of high-accuracy position 201.

In step 350, method 300 ends.

In a further embodiment, steps 310 and 320 are executed in reverse order. This is done in particular when the environment class is determined independently of the detected environmental data values. For example, the environment class is determined by the fact that an approximate position 202 of vehicle 100 is transferred to an external server 250 and the environment class is received from external server 250 as a function of approximate position 202.

What is claimed is:

1. A method for localizing and automatically operating a vehicle, the method comprising:
   detecting environmental data values that represent an environment of the vehicle, the environment of the vehicle encompassing at least one interfering object, which is determined to occur more;
   determining, in the vehicle, an environment class of the environment of the vehicle, after detection of the environmental data values;
   determining a position of the vehicle based on the environmental data values;
   filtering, with a filter, the at least one interfering object, which occurs more, so that other filters are not used for other objects, which occur less, out of the environmental data values, wherein the filter is selected as a function of the environment class, and wherein the position is determined after the at least one interfering object is filtered out; and
   automatically operating the vehicle as a function of the position;
   wherein the other filters are not used for the other objects, which occur less because of the filtering of the at least one interfering object, which occurs more, so as to increase a speed at which the position can be determined, and
   wherein the filter is selected as a function of the environment class by: (i) the environment class, which encompasses an interfering object, and (ii) the at least one filter that filters out at least the interfering object.

2. The method of claim 1, wherein the environment class is determined based on the environmental data values.

3. The method of claim 1, wherein the environment class is determined by an approximate position of the vehicle that is transferred to an external server, and by the environment class, as a function of the approximate position, that is received from the external server.

4. The method of claim 1, wherein the vehicle is automatically operated so that transverse and/or longitudinal control is applied to the vehicle as a function of the position.

5. The method of claim 1, wherein the at least one filter is selected as a function of the environment class by: (i) the environment class, which encompasses an interfering object, and (ii) the at least one filter that filters out at least the interfering object.

6. The method of claim 5, wherein the interfering object is a dynamic or a semi-static or a static interfering object.

7. The method of claim 1, wherein the environment of the vehicle encompasses the at least one interfering object so that at least one environmental feature, which is used to determine the position of the vehicle, is obscured at least partly and/or temporarily by the at least one interfering object.

8. A device, comprising:
   a non-transitory computer readable medium having a computer program, which is executable by a processor, including program code for localizing and automatically operating a vehicle, by performing the following:
   detecting environmental data values that represent an environment of the vehicle, wherein the environment of the vehicle encompasses at least one interfering object, which is determined to occur more;
   determining, in the vehicle, an environment class of the environment of the vehicle, after detection of the environmental data values;
   determining a position of the vehicle based on the environmental data values;
   filtering, with a filter, the at least one interfering object, which occurs more, so that other filters are not used for other objects, which occur less often, out of the environmental data values, wherein the filter is selected as a function of the environment class, and wherein the position is determined after the at least one interfering object is filtered out; and
   automatically operating the vehicle as a function of the position;
   wherein the other filters are not used for the other objects, which occur less because of the filtering of the at least one interfering object, which occurs more, so as to increase a speed at which the position can be determined, and
   wherein the filter is selected as a function of the environment class by: (i) the environment class, which encompasses an interfering object, and (ii) the at least one filter that filters out at least the interfering object.

9. The device of claim 8, wherein the environment class is determined based on the environmental data values.

10. The device of claim 8, wherein the environment class is determined by an approximate position of the vehicle that is transferred to an external server, and by the environment class, as a function of the approximate position, that is received from the external server.

11. The device of claim 8, wherein the vehicle is automatically operated so that transverse and/or longitudinal control is applied to the vehicle as a function of the position.

12. The device of claim 8, wherein the interfering object is a dynamic or a semi-static or a static interfering object.

13. The device of claim 8, wherein the environment of the vehicle encompasses the at least one interfering object so that at least one environmental feature, which is used to determine the position of the vehicle, is obscured at least partly and/or temporarily by the at least one interfering object.

* * * * *